(12) United States Patent
Kohler et al.

(10) Patent No.: US 10,608,213 B2
(45) Date of Patent: Mar. 31, 2020

(54) RECHARGEABLE BATTERY MODULES AND RECHARGEABLE BATTERY MODULE HANDLING METHODS

(71) Applicant: Lithium Werks Technology BV, Eersel (NL)

(72) Inventors: Marc Kohler, Austin, TX (US); Erik Lee, Cedar Park, TX (US); Robert Craig Walker, Cedar Park, TX (US)

(73) Assignee: Lithium Werks Technology BV (NL)

(*) Notice: Subject to any disclaimer, the term of this patent is extended or adjusted under 35 U.S.C. 154(b) by 162 days.

(21) Appl. No.: 15/701,179

(22) Filed: Sep. 11, 2017

(65) Prior Publication Data

US 2018/0076426 A1    Mar. 15, 2018

Related U.S. Application Data

(60) Provisional application No. 62/393,446, filed on Sep. 12, 2016.

(51) Int. Cl.
*H01M 2/10* (2006.01)

(52) U.S. Cl.
CPC ....... *H01M 2/1016* (2013.01); *H01M 2/1011* (2013.01)

(58) Field of Classification Search
CPC .......................... H01M 2/1016; H01M 2/1011
USPC ........................................................ 429/153
See application file for complete search history.

(56) References Cited

U.S. PATENT DOCUMENTS

| | | | |
|---|---|---|---|
| 3,956,022 A | 5/1976 | Fox | |
| 5,366,827 A | 11/1994 | Belanger et al. | |
| 5,993,241 A | 11/1999 | Olson et al. | |
| 6,219,249 B1 | 4/2001 | Tuccio et al. | |
| 6,798,170 B2 | 9/2004 | Cummings | |
| 7,986,124 B2 | 7/2011 | Stone et al. | |
| 8,779,718 B2 | 7/2014 | Stone et al. | |
| 2003/0039881 A1 | 2/2003 | Mount | |
| 2008/0118819 A1 | 5/2008 | Gamboa et al. | |
| 2009/0297933 A1 | 12/2009 | Bielawski et al. | |
| 2012/0271723 A1 | 10/2012 | Penilla et al. | |
| 2013/0288096 A1 | 10/2013 | Frutschy et al. | |

(Continued)

FOREIGN PATENT DOCUMENTS

WO    WO    3/2019
PCT/US2017/050998

OTHER PUBLICATIONS

WO PCT/US2017/050998 Inv Pay Fees, Nov. 8, 2017, Valence Technology, Inc.

(Continued)

*Primary Examiner* — Gary D Harris
(74) *Attorney, Agent, or Firm* — Wells St. John P.S.

(57) ABSTRACT

Rechargeable battery modules and rechargeable battery module handling methods are described. According to one aspect, a rechargeable battery module includes a housing, a plurality of terminals, a plurality of rechargeable cells within the housing and coupled with the terminals, and wherein the rechargeable cells are configured to store electrical energy, a plurality of lift members at different locations of the housing, and wherein the lift members provide a plurality of lift points for the rechargeable battery module which enable the rechargeable battery module to be lifted in a plurality of different orientations.

7 Claims, 11 Drawing Sheets

(56) References Cited

U.S. PATENT DOCUMENTS

2014/0322567 A1 10/2014 Stone et al.
2017/0008417 A1* 1/2017 Yoshida ................ H01M 2/105

OTHER PUBLICATIONS

WO PCT/US2017/050998 Search Rept., dated Jan. 9, 2018, Valence Technology, Inc.
WO PCT/US2017/050998 Writ Opin., dated Jan. 9, 2018, Valence Technology, Inc.
Kohler et al., Design U.S. Appl. No. 29/577,346, filed Sep. 12, 2016, titled "Battery Module", 10 pages.
Kohler et al., Design U.S. Appl. No. 29/670,926, filed Nov. 20, 2018, titled "Battery Module", 13 pages.
Kohler et al., U.S. Appl. No. 62/393,446, filed Sep. 12, 2016, titled "Battery Modules and Methods of Use", 53 pages.
LG Chem, "UPB4850", available online at https://www.lgesspartner.com/au/front/product.productInfo.dev?productType=ALL&main=Y, Jul. 31, 2016, 1 page.
Lithium Ion Battery Test Centre, "SONY Fortelion", available online at https://batterytestcenter.com/au/results/sony-fortelion/, Aug. 22, 2016, 2 pages.
Models Plus Inc. A Complete Model Making Company, available online at http://www.modelsplusinc.com/gallery.php, Jul. 29, 2016, 1 page.
Saft, "Seanergy® Modules", available online at http://www.saftbatteries.com/battery-search/seanergy?-modules, Sep. 27, 2015, 3 pages.
Saft, "Synerion® 48P High Power Lithium-Ion Module 48 V-18 kW", Product Brochure, May 2012, France, 2 pages.
Samsung SDI, "ESS Batteries by Samsung SDI", ESS Battery Solutions Regerence Guide, May 2017, United States, 7 pages.
SimpliPhi, "OES2.6 Smart-Tech Battery", available online at http://simpliphipower.com/products/oes2-6-smart-tech-battery/, Feb. 11, 2016, 5 pages.
Sony, "Sony to Ship 1.2kWh Energy Storage Modules using Rechargeable Litium-Ion Batteries made from Olivine-Type Phosphate", Press Release, available online at https://www.sony.net/SonyInfo/News/Press/201104/11-053E/, Apr. 18, 2011 (revised May 10, 2011), 3 pages.
Super B, "SB12V160E-ZC", available online at http://www.super-b.com/en/product/30/5/5/sb12v160e-zc, Nov. 1, 2015, 4 pages.
Power-Sonic Corporation, "PowerSonic PDC-12350 Rechargeable Sealed Lead Acid Battery", Product Specification Sheet, 2012, United States, 2 pages.
St. Angelo, U.S. Appl. No. 60/505,125, filed Sep. 22, 2003, titled "Large Format Secondary Battery", 43 pages.
Stone, U.S. Appl. No. 60/559,171, filed Mar. 31, 2004, titled "Electrical Systems, Power Supply Apparatuses, and Power Supply Operations Methods", 199 pages.
Valence Technology, Inc., "UCharge Battery Modules", Aug. 10, 2017, United States, 1 page.
Werker, "Lead Acid Battery", Aug. 10, 2017, United States, 1 page.

* cited by examiner

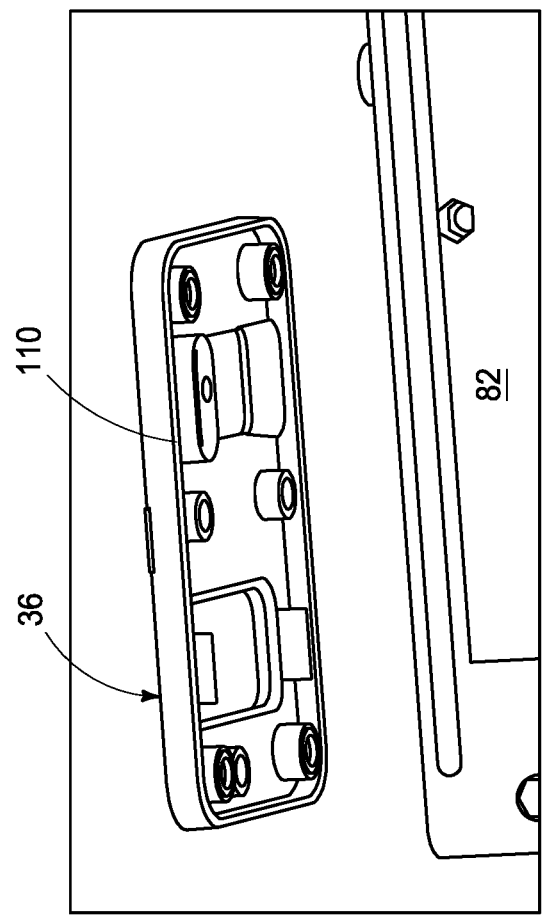

RECHARGEABLE BATTERY MODULES AND RECHARGEABLE BATTERY MODULE HANDLING METHODS

RELATED PATENT DATA

This application claims the benefit of U.S. Provisional Patent Application Ser. No. 62/393,446, filed Sep. 12, 2016, and titled "Battery Modules and Methods of Use," the disclosure of which is incorporated herein by reference.

TECHNICAL FIELD

This disclosure relates to rechargeable battery modules and associated methods including rechargeable battery module handling methods.

BACKGROUND OF THE DISCLOSURE

Rechargeable battery systems are used in varied applications which have different requirements for electrical energy. Rechargeable battery systems comprise rechargeable cells which receive electrical energy during charging operations and supply electrical energy to a load during discharging operations. Rechargeable cells may have different chemistries in different implementations, and may include Lithium Ion cells in one example. The number of rechargeable cells used in different applications is varied depending upon the requirements of the load, and the number of cells utilized in a given system may be numerous in some implementations including, for example, transportation and remote power applications. Accordingly, rechargeable battery systems may be designed and configured differently for use in different applications.

At least some aspects of the disclosure described below are directed to rechargeable power systems and associated methods.

BRIEF DESCRIPTION OF THE DRAWINGS

Example embodiments of the disclosure are described below with reference to the following accompanying drawings.

FIG. 8 is an illustrative representation of a lower portion of the positive terminal cover of FIG. 7 according to one embodiment.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Example embodiments of rechargeable power systems and associated methods thereof are described below. Some rechargeable power systems described below are implemented using a plurality of rechargeable battery modules which individually house one or more rechargeable cells. Different numbers of battery modules may be used and coupled in series or parallel with one another in different applications of the power systems. Example battery modules provide electrical energy at a voltage within the range of 12V-48V, although other arrangements are possible.

Figure 1:
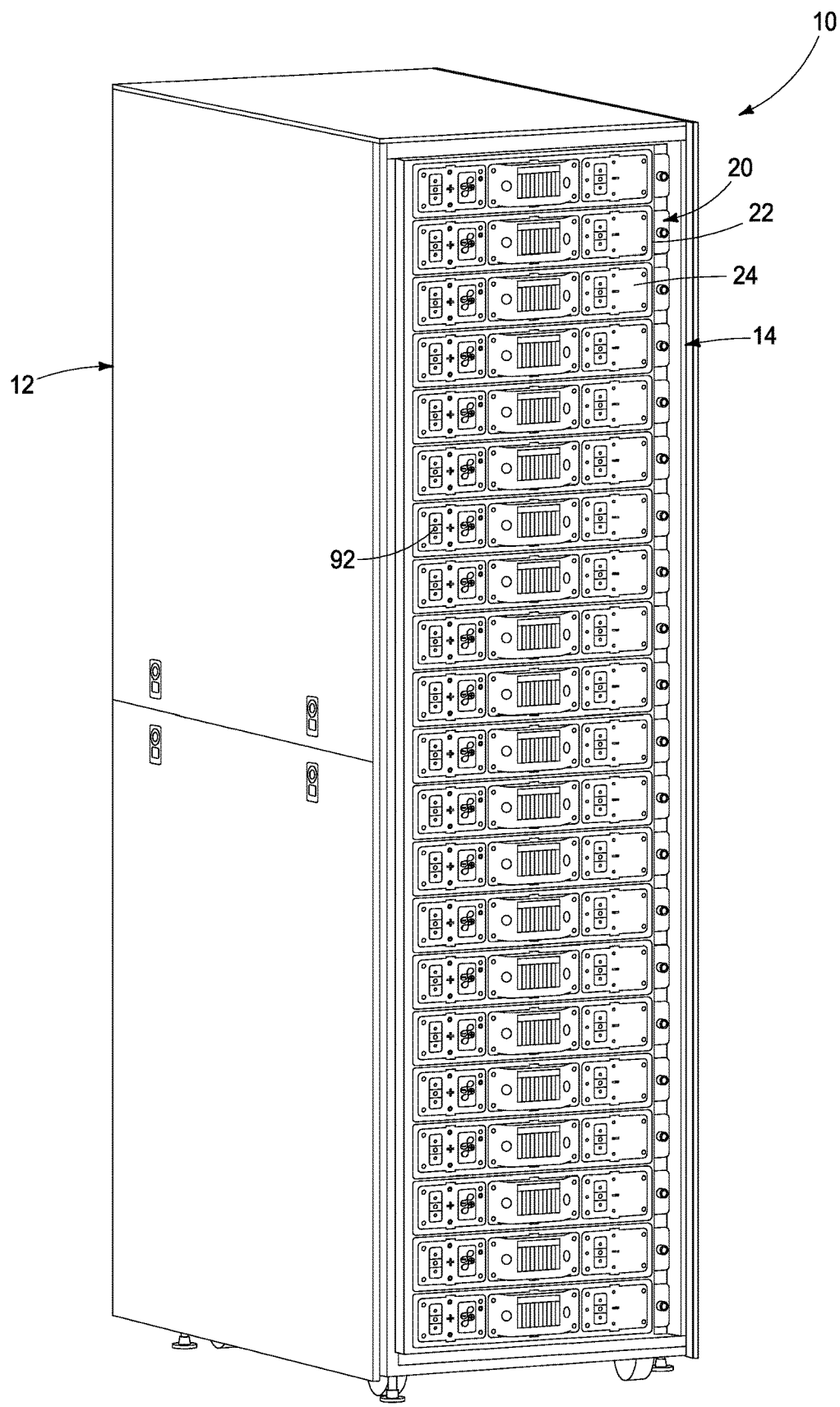
FIG. 1 is an illustrative representation of a rechargeable power system according to one embodiment.

Referring to FIG. 1, one example embodiment of a rechargeable power system 10 is shown. The depicted power system 10 includes a rack system 12 configured to house a plurality of rechargeable battery modules 20. The illustrated rack system 12 includes a front aperture 14 through which the battery modules 20 may be inserted into and stacked within the rack system 12 and removed therefrom, for example for servicing or replacement. Other embodiments of power system 10 are possible including, for example, arrangements which use a single battery module 20 in a standalone application and/or otherwise do not use a rack system 12. Battery modules 20 may be mounted horizontally, for example as shown in rack system 12 of FIG. 1, or in side or vertical mounting orientations in other implementations (not shown).

The battery modules 20 individually include a housing 22 which is configured to house one or more rechargeable battery cells of the respective module 20. The housing 22 may be mounted and attached to rack system 12 in one embodiment. Housing 22 is non-conductive and may be plastic, such as C6600 available from Sabic of Saudi Arabia, in one example embodiment. Housing 22 may be metal with a non-conductive coating in other embodiments.

The modules 20 include a front portion 24 which may be outwardly exposed through the front aperture 14 of the rack system 12. As described below, the front portion 24 of the battery modules 20 include a plurality of terminals which are configured to output and receive electrical energy. Accordingly, cables and other connections to the battery modules 20 are accessible to a user via the front portions 24 when the modules 20 are installed within rack system 12.

Figure 2:
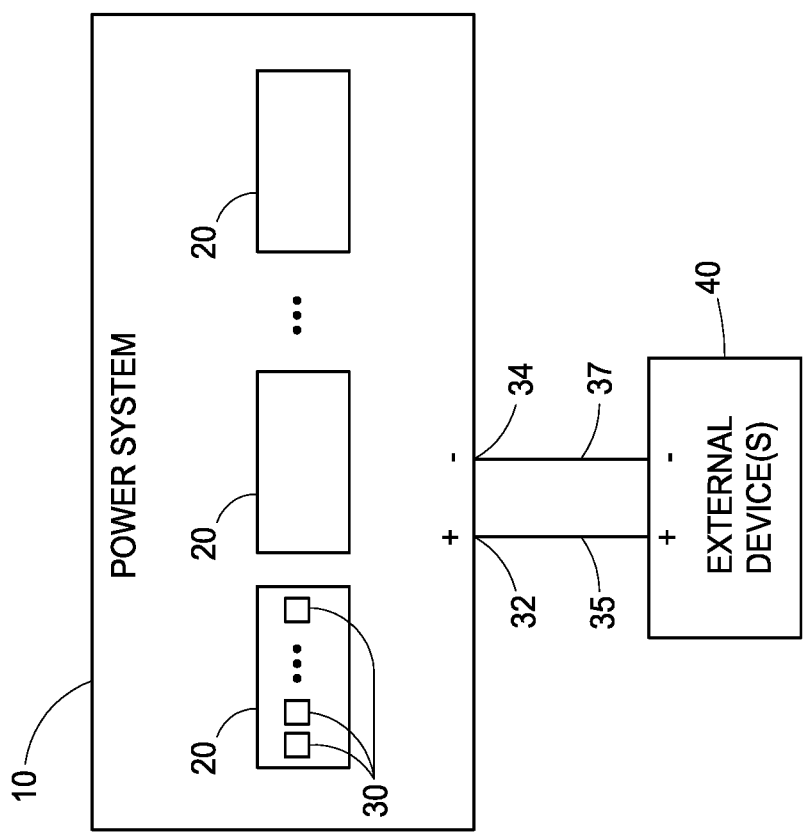
FIG. 2 is a functional block diagram of a rechargeable power system coupled with an external device according to one embodiment.

Referring to FIG. 2, the battery modules 20 individually include at least one and typically a plurality of rechargeable cells 30 which are individually configured to receive, store and discharge electrical energy. Example rechargeable cells are Lithium cells, available from Valence Technology, Inc., although any other suitable cells which are configured to store electrical energy may be used. Example cells which may be used may have different form factors, such as cylindrical, prismatic, pouch, etc. and sizes. Additional circuitry and components (not shown in FIG. 2) may be included within a given module, such as monitoring or control electronics.

Figure 3:
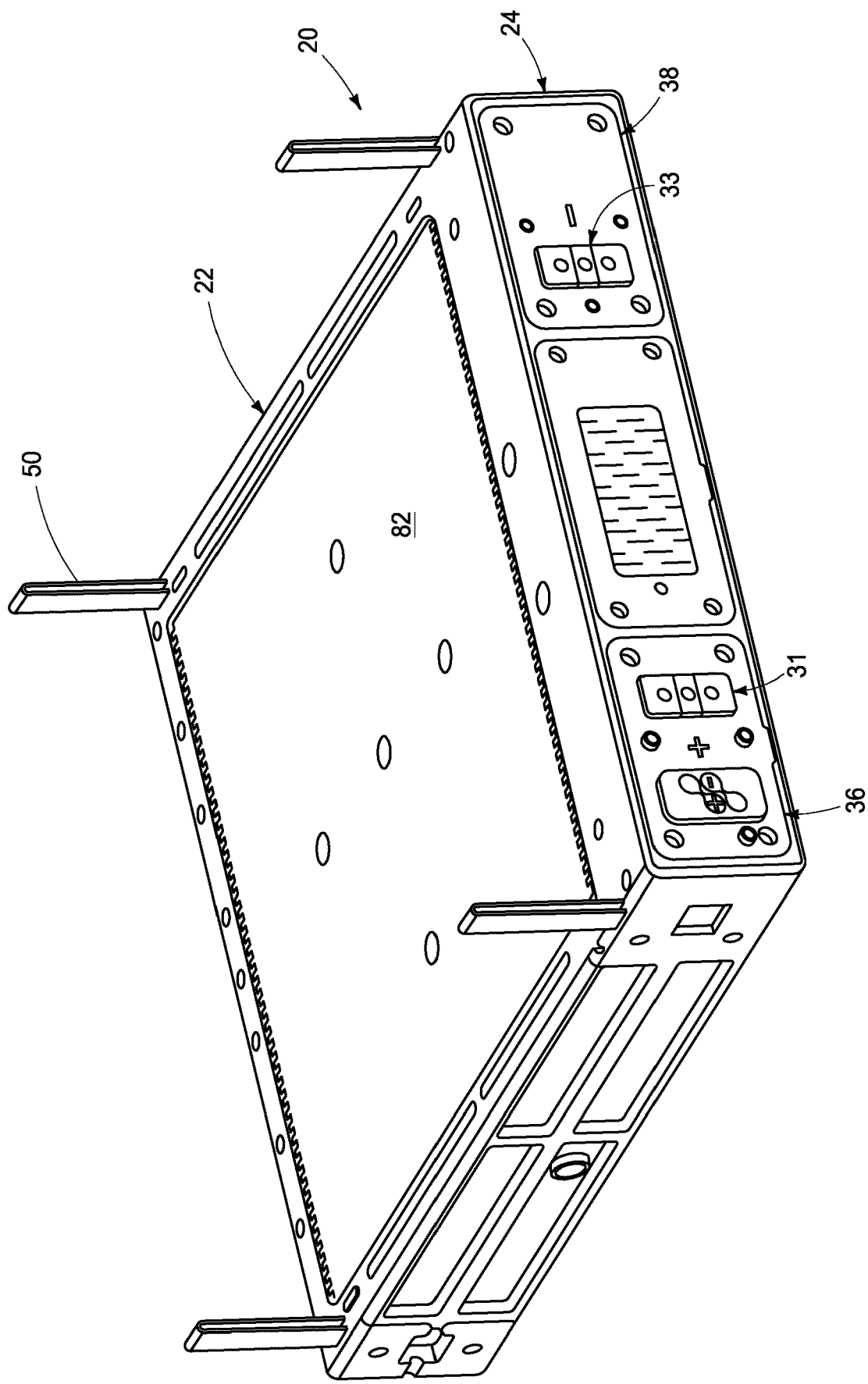
FIG. 3 is an illustrative representation of a rechargeable battery module according to one embodiment.

The depiction of rechargeable cells 30 is illustrative in FIG. 2, and the number and arrangement of the rechargeable cells 30 within a single battery module 20 may be varied in different implementations. For example, the rechargeable cells 30 of a given module 20 may be connected with one another in series or in parallel with terminals 31, 33 of opposite electrical polarity (i.e., positive and negative) of the module 20 in some embodiments (example terminals 31, 33 of an example module 20 are shown in FIG. 3). The battery modules 20 and the rechargeable cells 30 therein are configured identically to one another in some implementations of power system 10.

The positive and negative terminals 32, 34 are configured to conduct electrical energy with respect to one or more external devices 40 which are external of the power system 10 in the illustrated embodiment. Terminals 32, 34 are directly electrically connected with respective electrical conductors 35, 37, such as power cables, in the example of FIG. 2.

Battery modules 20 may be arranged differently within different configurations of power system 10. For example, battery modules 20 may be arranged in series and/or parallel between terminals 32, 34 of the power system 10. Electrical conductors, such as wires or cables, may be directly connected with terminals 31, 33 of the modules 20 to couple the modules in series and/or parallel with terminals 32, 34 of power system 10 in one embodiment.

During charging of power system 10, the power system 10 receives electrical energy from one or more external devices 40, and conversely, power system 10 outputs electrical energy to one or more external devices 40 during discharging of power system 10. In some arrangements, one of the external devices 40 is a charger and another of the external devices 40 is a load.

In additional arrangements, power system 10 is connected with only one external device 40 which both provides electrical energy to charge power system 10 and receives electrical energy during discharging of power system 10. In a more specific example, one or more of the battery modules 20 may be installed within an electrical vehicle and provide stored electrical energy from internal cells 30 to an electric motor of the electrical vehicle and receive electrical energy from an alternator of the electrical vehicle or an electric motor operating in a regenerative mode.

In some arrangements, a disconnect device (not shown), such as a contactor, relay and/or circuit breaker, may be implemented between one of the terminals 32, 34 and external devices 40.

Referring to FIG. 3, details of an individual rechargeable battery module 20 are shown according to one embodiment. Battery module 20 includes positive and negative terminals 31, 33 which are electrically coupled with rechargeable cells (not shown) internal of housing 22. The positive and negative terminals 31, 33 of module 20 are configured to be directly mechanically and electrically coupled with respective external conductors (not shown), such as wires or cables, which may be coupled in series or parallel with external devices, such as other battery modules, a load or a charger, for example.

The illustrated housing 22 of module 20 includes a positive terminal cover 36 and a negative terminal cover 38 which are coupled with a main body 82 of housing 22. Portions of the positive and negative terminals 31, 33 are outwardly exposed through the respective covers 36, 38 in the depicted embodiment. In some arrangements, at least one of the positive and negative terminal covers 36, 38 may be oriented differently with respect to the main body 82 of housing 22 to provide fused or non-fused operation of battery module 20 at different moments in time as described in additional detail below.

Figure 4:
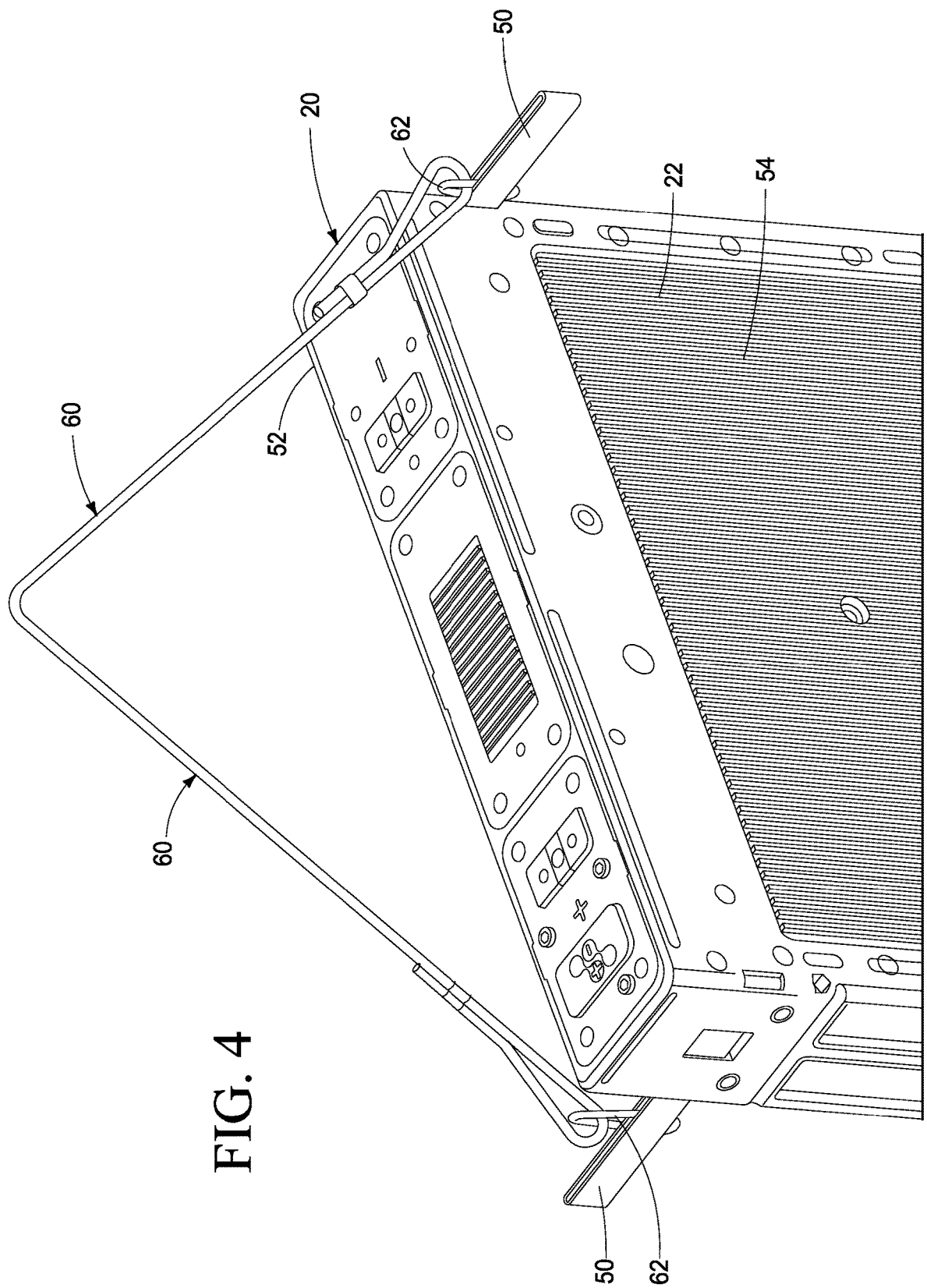
FIG. 4 is an illustrative representation of use of a lift assembly to provide vertical lifting of a battery module according to one embodiment.
Figure 4A:
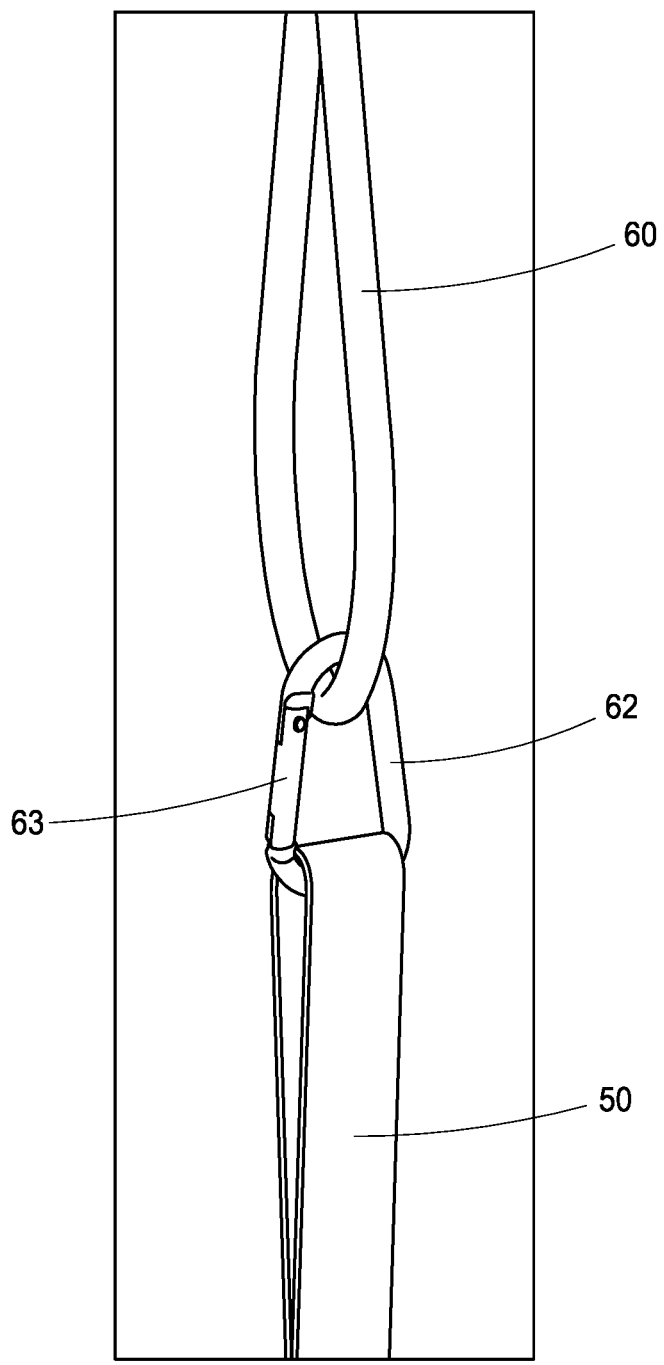
FIG. 4A is an illustrative representation of an attachment member according to one embodiment.
Figure 5:
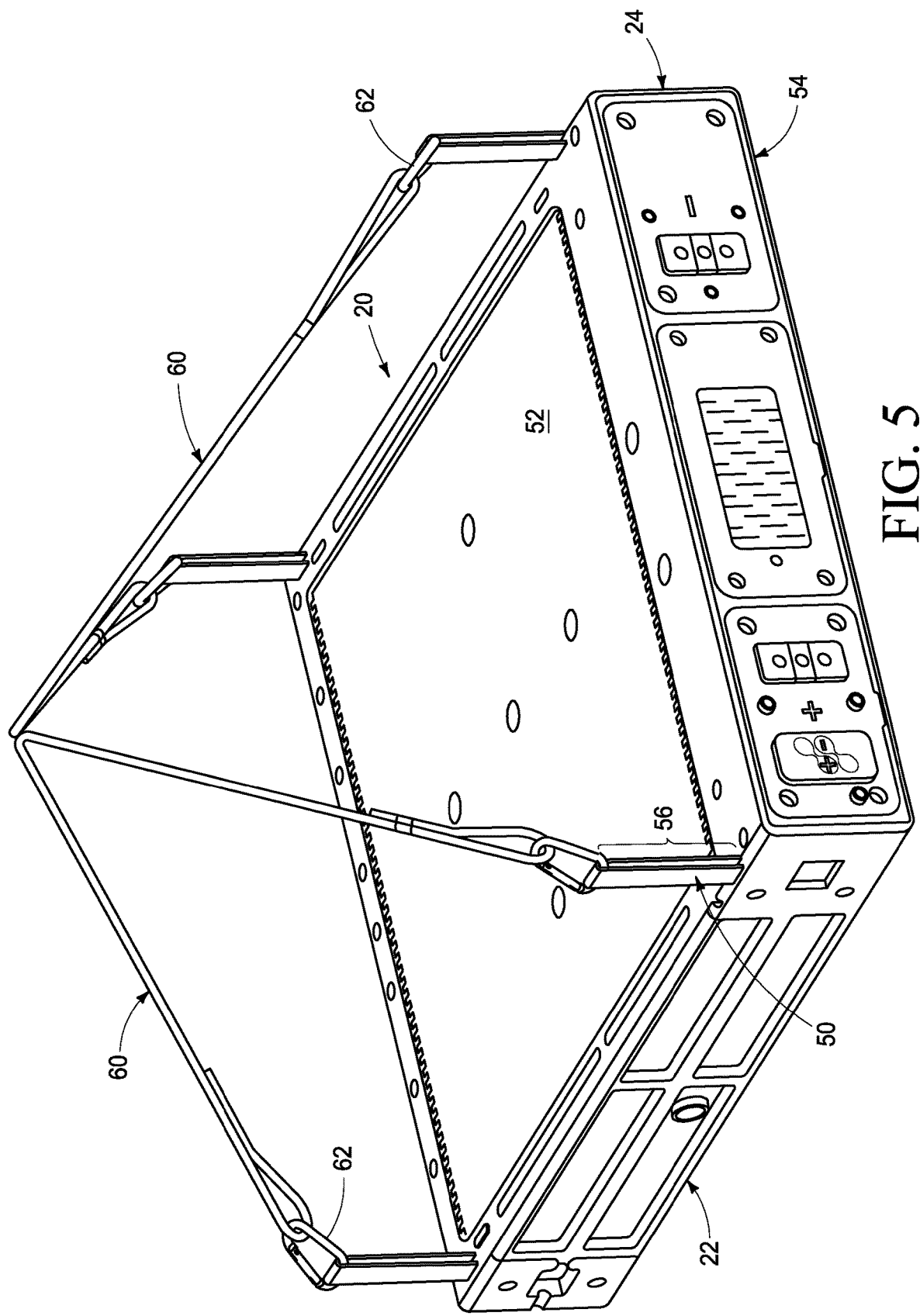
FIG. 5 is an illustrative representation of use of a lift assembly to provide horizontal lifting of a battery module according to one embodiment.

Referring to FIGS. 4, 4A and 5, details of example lift assemblies which are configured to assist with the handling of a battery module 20 are described according to example embodiments. The lift assemblies of the depicted battery modules 20 in FIGS. 4 and 5 include a plurality of lift members 50 and one or more handles 60 which are configured to removably engage the lift members 50.

The lift assemblies may be used by a user to lift, move and lower a module 20, for example, during removal of a module 20 from packaging and installation of the module 20. The lift assemblies may be used with battery modules 20 of different weights from 0-35 kg in illustrative embodiments described herein. In addition, the example lift assemblies described herein are relatively light weight, small in size, strong, and easy to transport and use.

In one embodiment, lift members 50 are straps made of a flexible material, such as Nylon. Portions 56 of the lift members 50 are configured to extend outwardly from the housing 22 during use in some embodiments. The lift members 50 provide a plurality of lift points for the battery module 20 which enable the module 20 to be lifted, moved and lowered in a plurality of different orientations with respect to ground. Handles 60 may also be coupled with different ones of the lift members 50 at different moments in time to enable the module 20 to be conveniently lifted, moved and lowered in the different orientations with respect to the ground. The lift members 50 and handle 60 are arranged in FIG. 4 to assist a user with lifting the module 20 in a substantially vertical orientation with respect to the ground while the lift members 50 and handles 60 in FIG. 5 assist a user with lifting of module 20 in a substantially horizontal orientation with respect to the ground.

In one embodiment, the lift members 50 are positioned at different locations of housing 22 to provide the different lift points. In some implementations, the lift members 50 are positioned at different locations at or adjacent to the periphery of housing 22. In the illustrated examples of modules 20 shown in FIGS. 4 and 5, housing 22 is generally in the shape of a cuboid and the lift members 50 are located adjacent to the four corners of opposing top and bottom surfaces 52, 54 of the housing 22.

Portions 56 of the lift members 50 are configured to be extended from different surfaces of the housing 22 to assist with the lifting of module 20 in different orientations with respect to ground in one embodiment. A user may configure the lift members 50 to extend from the different surfaces of housing 22 at different times to assist with moving of the module 20 in the different orientations. For example, in the vertical lifting arrangement of FIG. 4, portions 56 of two lift members 50 extend outwardly from one of the top and bottom surfaces 52, 54 of housing 22. In the horizontal lifting arrangement of FIG. 5, portions 56 of four lift members extend outwardly from top surface 52 of housing 22.

In addition, the lift members 50 are flexible and outwardly extending portions 56 thereof may be bent or folded adjacent to the housing 22 following installation of the battery module 20 in one embodiment, for example to permit stacking of plural modules 20 in rack system 12. Additional details regarding example configurations of lift members 50 are set forth below.

In some arrangements, handles 60 are not used and extended portions 56 of lift members 50 may be used to lift the module 20 by hand. For example, in lifting a module 20 in the horizontal orientation with respect to ground, two people standing on opposite sides of the module may lift the module by grabbing or sliding their hands or fingers through the extended portions 56 of the lift members 50.

In FIG. 4, a single handle 60 is coupled with two lift members 50 to assist a user with vertical lifting of the battery module 20. Opposite ends of handle 60 include attachment members 62 which are configured to be removably coupled with respective lift members 50 of battery module 20 in one embodiment. In one example, handles 60 are implemented using rope, Nylon or cable and lift members 50 form respective loops which receive the attachment members 62.

Attachment members 62 may be implemented in different ways, such as hooks, clasps, rings, etc., to provide removable coupling of handle 60 with lift members 50. Referring to FIG. 4A, an example attachment member 62 in the form of a ring is shown which includes a movable portion 63 to enable the attachment member 62 to be removably connected with lift member 50 and handle 60.

Attachment of handle 60 to the lift members 50 which extend from opposite surfaces 52, 54 of the housing allows the battery module 20 to be lifted in a substantially vertical orientation without tilting. Attachment of the handle 60 to lift members 50 which are adjacent to front portion 24 of housing 22 allows the battery module 20 to be lowered into place while providing easy access of the user to the attachment members 62 to remove the handle 60 from housing 22 after appropriate placement of the battery module 20.

In FIG. 5, two handles 60 are coupled with portions 56 of four lift members 50 which extend from surface 52 to provide horizontal lifting of battery module 20. In the depicted example, a first of the handles 60 is coupled with two lift members 50 which are adjacent to a left surface of housing 22 while a second handle 60 is coupled with two lift members 50 which are adjacent to a right surface of housing 22. Portions 56 of lift members 50 may also be extended from surface 54 if desired for handling.

Figure 6A:
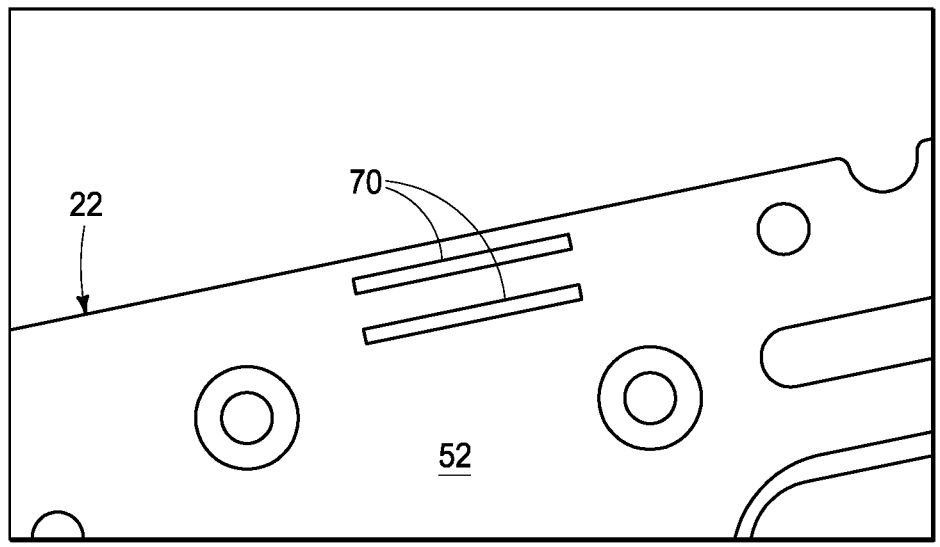
FIGS. 6A-6E are illustrative representations of attachment of a lift member to a housing of a battery module according to one embodiment.

Referring to FIGS. 6A-6E, additional details of lift members 50 and attachment thereof to housing 22 of battery module 20 are shown according to one embodiment. In the example of FIG. 6A, a plurality of apertures 70 in the form of slots or channels extend between opposing top and bottom surfaces 52, 54 of housing 22 and the apertures 70 are configured to receive a lift member 50.

Figure 6B:
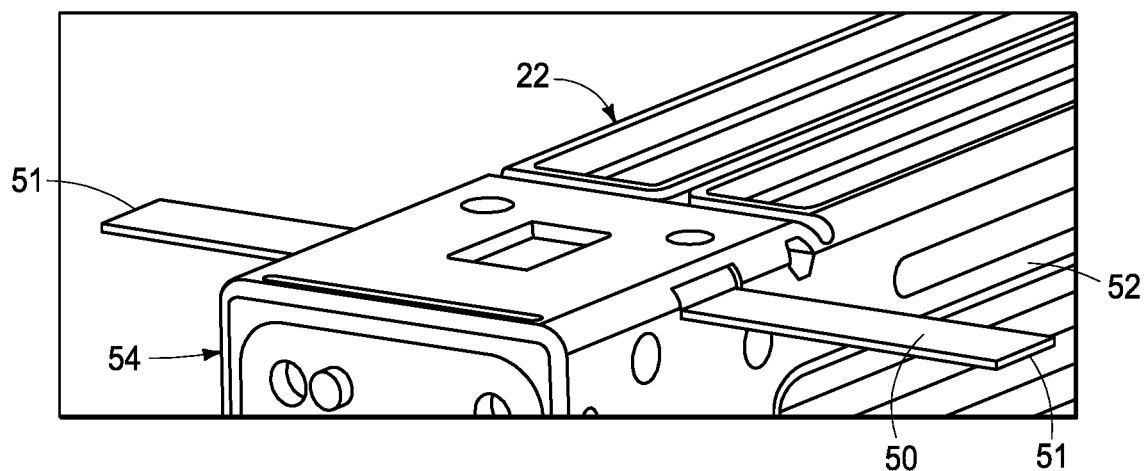

In FIG. 6B, an end of lift member 50 is inserted into the innermost aperture 70 to a position such that opposing ends 51 of the lift member 50 extend outwardly of opposing surfaces 52, 54 of the housing 22.

Figure 6C:
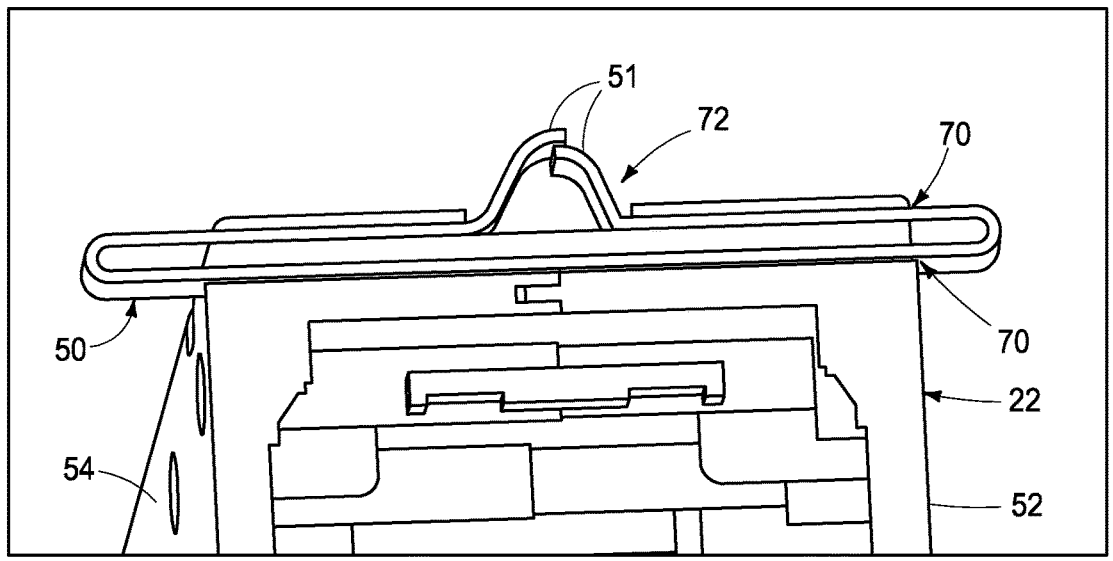

FIG. 6C is a cross-sectional view wherein the opposing ends 51 of lift member 50 have been folded and inserted into the outermost aperture 70 and drawn through an aperture 72 in the housing 22.

Figure 6D:
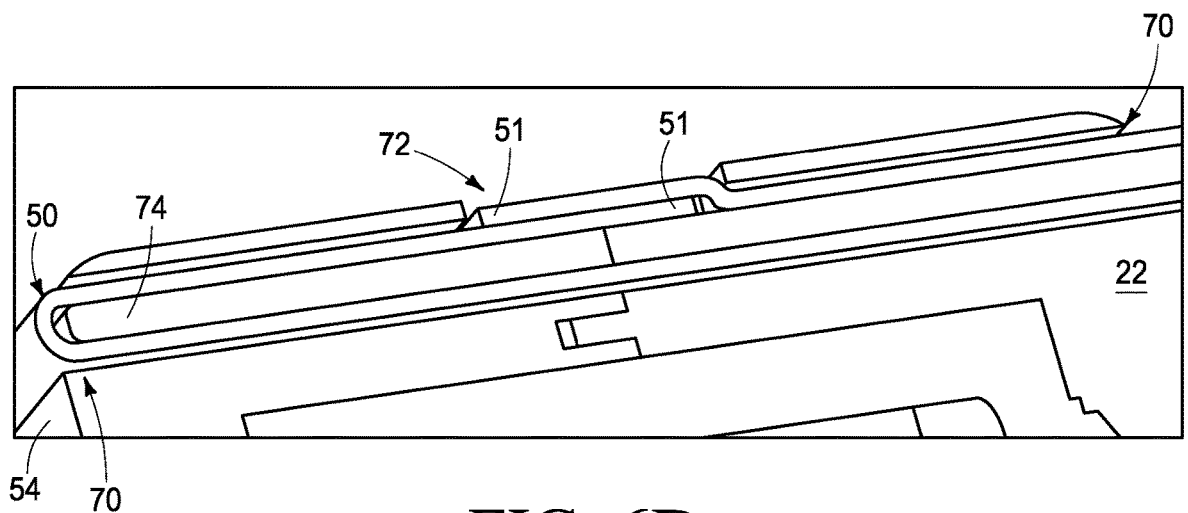

In FIG. 6D, the opposing ends 51 of lift member 50 are joined together to form a closed loop about a rib 74 of housing 22 which affixes the lift member 50 to housing 22. The opposing ends 51 of lift member 50 may be joined by stitching or welding in example embodiments. Portions of the lift member 50 may be extended outwardly from either surface 52, 54 in the described embodiment. An attachment member 62 of a handle 60 may be coupled with portions of the lift member 50 which extend outward of the housing 22, for example, as shown in FIGS. 4 and 5.

Figure 6E:
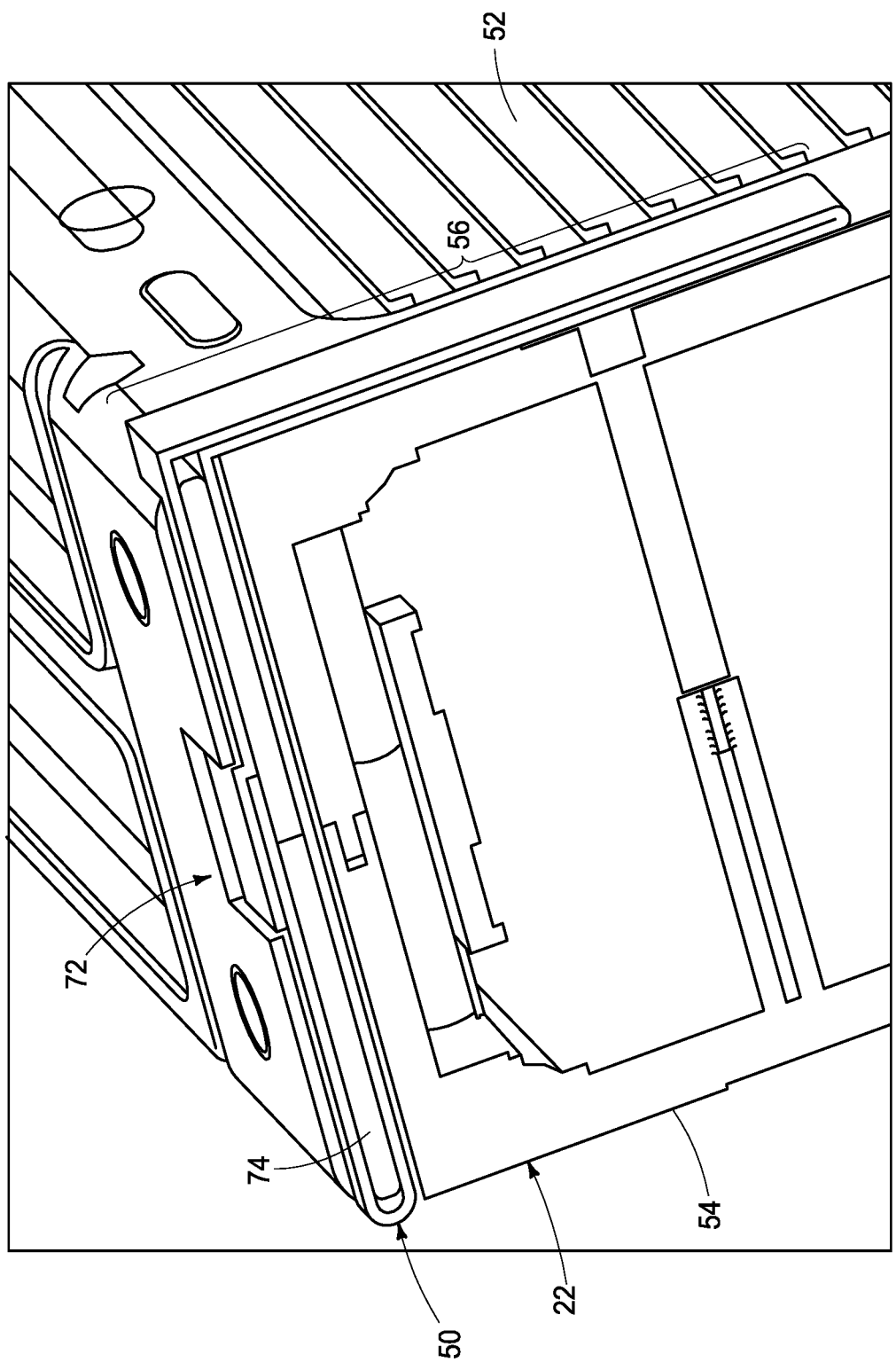

In FIG. 6E, the lift members 50 are flexible and an outwardly extending portion 56 of the lift member 50 may be folded flush with one of the surfaces 52, 54 of housing 22 (i.e., surface 52 in the example of FIG. 6E), for example following installation of the module 20 within rack system 12 and to allow stacking of another module 20 adjacent to surface 52.

The lift members 50 are configured in the above-described embodiments such that the outwardly extending portions 56 thereof may extend from different surfaces of the housing at different moments in time. As shown in FIG. 4, outwardly extending portions 56 of the lift members 50 extend from opposing surfaces 52, 54 while outwardly extending portions 56 of the lift members 50 extend from the same surface 52 of housing 22 in FIG. 5. Accordingly, lift members 50 may be extended outwardly from housing 22 and retracted inwardly with respect to housing 22 by a user as desired.

As mentioned above with respect to FIG. 3, one of the positive and negative terminal covers 36, 38 may be oriented differently with respect to main body 82 of housing 22 at different moments in time to provide fused or non-fused operation of battery module 20 as described in additional detail below. For example, the positive terminal cover 36 is shown in two different positions with respect to the main body 82 of housing 22 of the battery modules 20 shown in FIGS. 1 and 3. In one embodiment, the positive and negative terminal covers 36, 38 are configured differently such that they cannot be used to cover the terminals 31, 33 of the opposite polarity, for example by use of different groves or keys (not shown) in the covers 36, 38 and/or main body 82 of housing 22.

Figure 7:
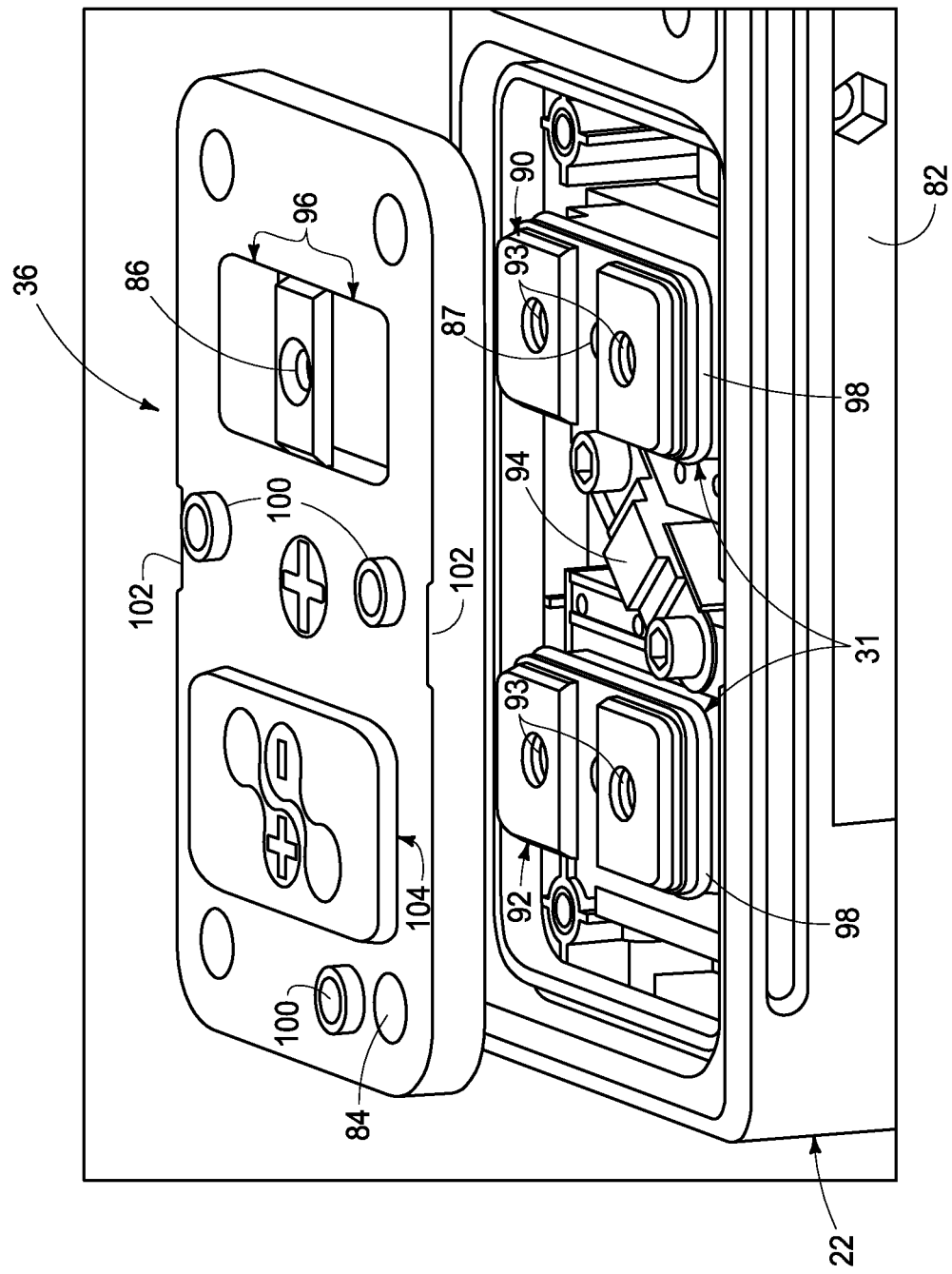
FIG. 7 is an illustrative representation of a positive terminal cover spaced from a main body of a housing of a battery module according to one embodiment.

Referring to FIG. 7, an example embodiment is described where positive terminal cover 36 may be oriented in different positions relative to main body 82 of housing 22 to provide the fused or non-fused operation of battery module 20 at different moments in time. More specifically, during fused operation of battery module 20, a fuse is provided in series between the positive terminal 31 and the rechargeable cells of the module 20 while a fuse is not utilized between the positive terminal 31 and the rechargeable cells during non-fused operation of battery module 20.

In FIG. 7, the illustrated positive terminal cover 36 is shown spaced from a main body 82 of the housing 22. Positive terminal cover 36 has a plurality of apertures 84 located at the respective corners thereof as well as an interior aperture 86 in the illustrated embodiment. The apertures 84, 86 receive respective screws (not shown) which are used to secure the cover 36 to the main body 82 of housing 22 during use of the battery module 20. Aperture 86 is aligned with one of the apertures 87 in terminal connections 90, 92 (described below) when cover 36 is positioned in the different orientations with respect to main body 82 of housing 22 in the illustrated embodiment.

Positive terminal 31 includes a plurality of terminal connections 90, 92 in the depicted embodiment. Terminal connections 90, 92 are configured to be directly electrically coupled with external electrical conductors, such as wires and cables, in one embodiment. For example, the external electrical conductors may be electrically connected with terminals 31, 33 of other modules 20 and/or terminals 32, 34 of power system 10. Furthermore, a fuse 94 is electrically coupled between the terminal connections 90, 92 of positive terminal 31. In other embodiments, negative terminal 33 may be configured as shown in FIG. 7 to include fuse 94 instead of inclusion of the fuse 94 at positive terminal 31 as depicted.

Terminal connection 92 is electrically coupled with the rechargeable cells within housing 22 while terminal connection 90 is electrically coupled with the rechargeable cells within housing 22 via the fuse 94 and terminal connection 92. Accordingly, fuse 94 is coupled between only terminal connection 90 of positive terminal 31 and the rechargeable cells of the module 20 and terminal connection 92 of positive terminal 31 conducts electrical energy with respect to the rechargeable cells of the module 20 without a fuse in the described example embodiment.

In one embodiment, each of the terminal connections 90, 92 is configured to be directly electrically connected with an electrical conductor (not shown) which conducts electrical energy between rechargeable cells of the module 20 and other modules 20 and/or an external device 40. Each of terminal connections 90, 92 includes one or more aperture 93 which is configured to connect with the electrical conductor which conducts electrical energy to or from the battery module 20 via the respective terminal connection 90, 92 in the illustrated embodiment.

The housing 22 including cover 36 is configured to allow only one of the first and second terminal connections 90, 92 to be directly electrically connected with the external conductor at a given moment in time in one embodiment. In the depicted example embodiment, positive terminal cover 36 outwardly exposes only one of the terminal connections 90, 92 at a given moment in time. In particular, positive terminal cover 36 has an offset aperture 96 in the illustrated embodiment which is configured to outwardly expose only one of the terminal connections 90, 92 when the cover 36 is affixed to the main body 82 of housing 22. Plural O-rings 98 are provided about terminal connections 90, 92 and operate to form a seal with the cover 36 about aperture 96 when the cover 36 is affixed to the main body 82.

In example implementations, cover 36 is attached in a first orientation or position relative to main body 82 of housing 22 to outwardly expose terminal connection 92 as is shown in the modules 20 of FIG. 1 (and not outwardly expose terminal connection 90) to provide fused operation at one moment in time, for example, when battery module 20 is coupled in parallel with other battery modules. Cover 36 is attached in a second orientation or position relative to main body 82 at another moment in time as is shown in FIG. 7 to outwardly expose terminal connection 90 (and not outwardly expose terminal connection 92) to provide non-fused operation, for example, when battery module is coupled in series with other battery modules. In some embodiments, coupling of the fuse 94 in series with other modules may result in the voltage rating of the fuse 94 being exceeded, and accordingly, the fuse 94 is bypassed and not utilized when cover 36 outwardly exposes terminal connection 92. Removal of positive terminal cover 36 from main body 82 of housing 22 facilitates access to and replacement of fuse 94 if needed.

In the illustrated embodiment, positive terminal cover 36 includes a plurality of mounting apertures 100 which enable other components, such as a contactor (not shown), to be mounted to housing 22. Cover 36 also includes a plurality of recesses 102 in the illustrated embodiment which may be used to pry the cover 36 from the main body 82 of housing 22. Cover 36 also includes a raised portion 104 in the illustrated embodiment to provide sufficient space for the one of the terminal connections 90, 92 which is not outwardly exposed when the cover 36 is attached to the main body 82 of housing 22.

Referring to FIG. 8, a sealing gasket 110 is provided at the lower periphery of the positive terminal cover 36 which forms a seal with the main body 82 of housing 22 when cover 36 is attached to the housing 22 in one embodiment.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A rechargeable battery module comprising:
a housing;
a plurality of terminals of opposite electrical polarities, and wherein one of the terminals has first and second terminal connections;
a plurality of rechargeable cells within the housing and electrically coupled with the terminals, and wherein the rechargeable cells are configured to store electrical energy;
a fuse coupled intermediate the rechargeable cells and only one of the first and second terminal connections of the one terminal; and
wherein the housing comprises a cover which is configured to be arranged in different positions with respect to the first and second terminal connections, and wherein only the first terminal connection is outwardly exposed of the housing with the cover arranged in a first of the different positions and only the second terminal connection is outwardly exposed of the housing with the cover arranged in a second of the different positions.

2. The battery module of claim 1 wherein electrical energy is conducted via the outwardly exposed one of the first and second terminal connections.

3. The battery module of claim 1 wherein the one of the terminals is a positive terminal.

4. The battery module of claim 1 wherein the other of the first and second terminal connections is electrically coupled with the rechargeable cells without the fuse.

5. The battery module of claim 1 wherein the rechargeable cells conduct electrical energy via the one of the first and second terminal connections in parallel with other battery modules.

6. The battery module of claim 1 wherein the rechargeable cells conduct electrical energy via another of the first and second terminal connections in series with other battery modules.

7. The battery module of claim 1 wherein the first and second terminal connections are individually configured to be directly coupled with an electrical conductor which is configured to conduct the electrical energy between the rechargeable cells and a device which is external of the rechargeable battery module.

* * * * *